(12) United States Patent
Wiedenhoeft et al.

(10) Patent No.: US 12,073,554 B2
(45) Date of Patent: Aug. 27, 2024

(54) CHARCOAL IDENTIFICATION SYSTEM

(71) Applicant: The United States of America, as Represented by the Secretary of Agriculture, Washington, DC (US)

(72) Inventors: Alex Wiedenhoeft, Madison, WI (US); Prabu Ravindran, Madison, WI (US)

( * ) Notice: Subject to any disclaimer, the term of this patent is extended or adjusted under 35 U.S.C. 154(b) by 340 days.

(21) Appl. No.: 17/370,345

(22) Filed: Jul. 8, 2021

(65) Prior Publication Data
US 2023/0010113 A1 Jan. 12, 2023

(51) Int. Cl.
*G06T 7/00* (2017.01)
*G06T 7/11* (2017.01)

(52) U.S. Cl.
CPC ............... *G06T 7/001* (2013.01); *G06T 7/11* (2017.01); *G06T 2207/20081* (2013.01); *G06T 2207/20084* (2013.01)

(58) Field of Classification Search
CPC . G06T 7/001; G06T 7/11; G06T 2207/20081; G06T 2207/20084; G06T 2207/30161; G06T 7/0002; G06T 2207/20021; G06T 2207/20076
See application file for complete search history.

(56) References Cited

U.S. PATENT DOCUMENTS

| | | | |
|---|---|---|---|
| 2013/0028487 A1 | 1/2013 | Stager et al. | |
| 2013/0235183 A1 | 9/2013 | Redden | |
| 2015/0238148 A1 | 8/2015 | Georgescu et al. | |
| 2017/0032285 A1 | 2/2017 | Sharma et al. | |
| 2023/0010113 A1* | 1/2023 | Wiedenhoeft | G06T 7/11 |
| 2023/0024974 A1* | 1/2023 | Rendahl | G06V 20/52 |

OTHER PUBLICATIONS

Menon, Luciana T., et al. "Data augmentation and transfer learning applied to charcoal image classification." 2019 International Conference on Systems, Signals and Image Processing (IWSSIP). IEEE, 2019. (Year: 2019).*

* cited by examiner

*Primary Examiner* — Bobbak Safaipour

(57) ABSTRACT

A method for identifying charcoal products includes capturing, by a camera, an image of a sample of charcoal. The method also includes analyzing, by a processor in communication with the camera, the image of the sample to identify characteristics of the sample. The method also includes comparing, by the processor, the identified characteristics to a plurality of signatures to determine a match between the identified characteristics and known characteristics associated with each signature in the plurality of signatures. The method further includes generating, by the processor, an output based on the comparison.

8 Claims, 15 Drawing Sheets

Charcoal position

Visible light

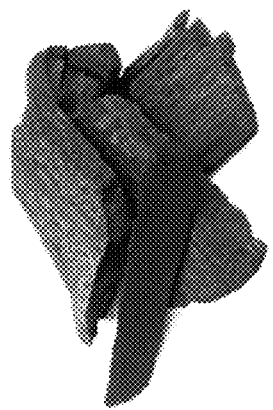
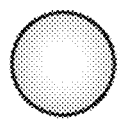
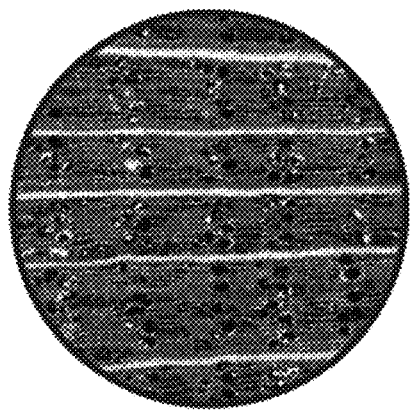
Fig. 1B
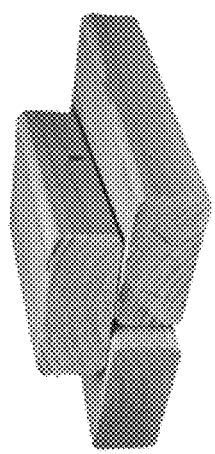
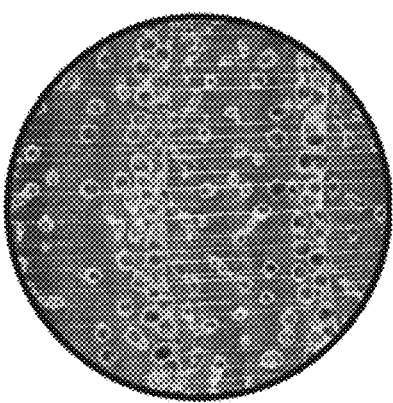
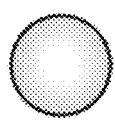
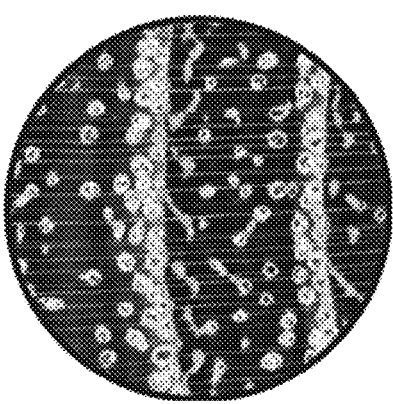
Fig. 1A

| Label | Species | Image Count |
|---|---|---|
| Albizia | Albizia adianthifolia | 300 |
| | Albizia coriaria | |
| | Albizia ferruginea | |
| | Albizia grandibracteata | |
| | Albizia gummifera | |
| | Albizia zygia | |
| Detarium | Detarium macrocarpum | 197 |
| | Detarium microcarpum | |
| | Detarium senegalense | |
| | Detarium sp | |
| Dialium | Dialium aubrevillei | 49 |
| | Dialium bipindense | |
| | Dialium dinklagei | |
| | Dialium platysepalum | |
| Hymenaea | Hymenaea courbaril | 300 |
| | Hymenaea oblongifolia | |
| Inga | Inga acrocephala | 180 |
| | Inga alba | |
| | Inga bracteosa | |
| | Inga jermani | |
| Morus | Morus alba | 300 |
| | Morus australis | |
| | Morus rubra | |
| Nauclea | Nauclea diderrichii | 300 |
| | Nauclea orientalis | |
| Robinia | Robinia neo-mexicana | 300 |
| | Robinia pseudoacacia | |
| Swietenia | Swietenia macrophylla | 300 |
| Tectona | Tectona grandis | 300 |
| Ulamericana | Ulmus americana | 300 |
| Ulrubra | Ulmus rubra | 300 |

Fig. 6A

| Label | Image Count |
|---|---|
| Acer | 300 |
| Betula | 300 |
| Carpinus | 193 |
| Fagus | 167 |
| Fraxinus | 290 |
| Quercus | 122 |

Fig. 6B

| Hyperparameter | Value |
|---|---|
| Patch size | 512 × 192 (pixels) |
| Minibatch size | 16 |
| Number of epochs (stage 1) | 10 |
| Number of epochs (stage 2) | 8 |
| $\alpha_{max}$ (stage 1) | $2e^{-2}$ |
| $\alpha_{max}$ (stage 2) | $1e^{-5}$ |
| $\alpha_{min}$ (stages 1, 2) | $\alpha_{max}/10$ |
| $\beta_{max}$ | 0.95 |
| $\beta_{min}$ | 0.85 |

Fig. 7

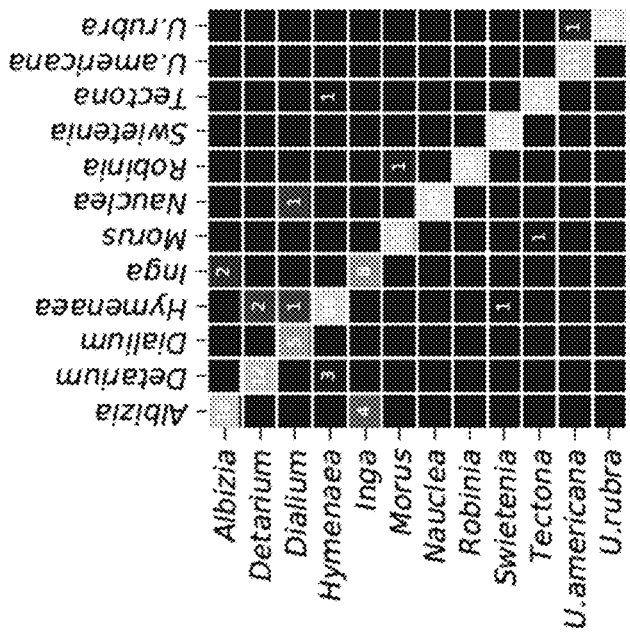
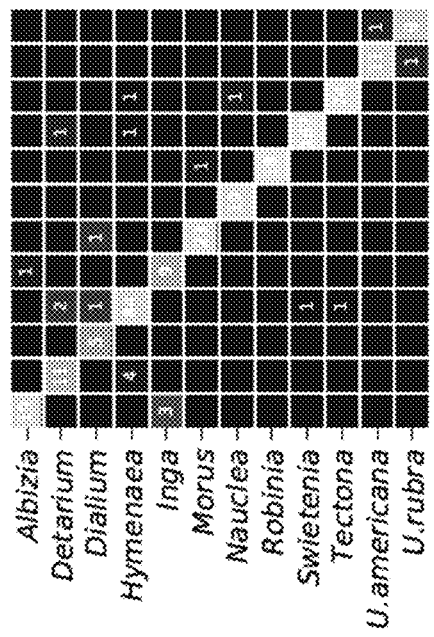
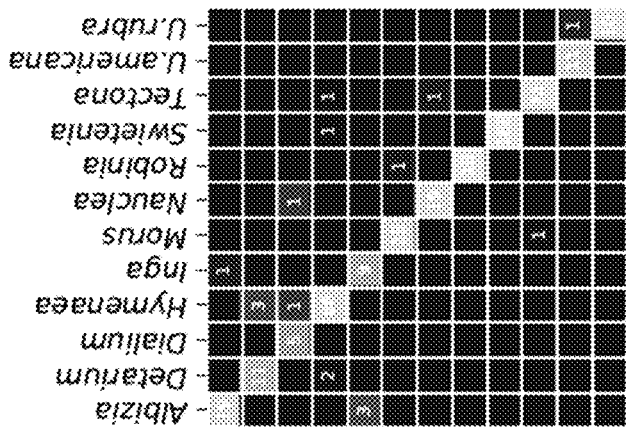
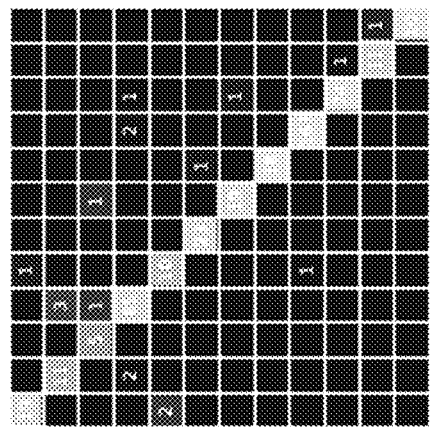
Fig. 8

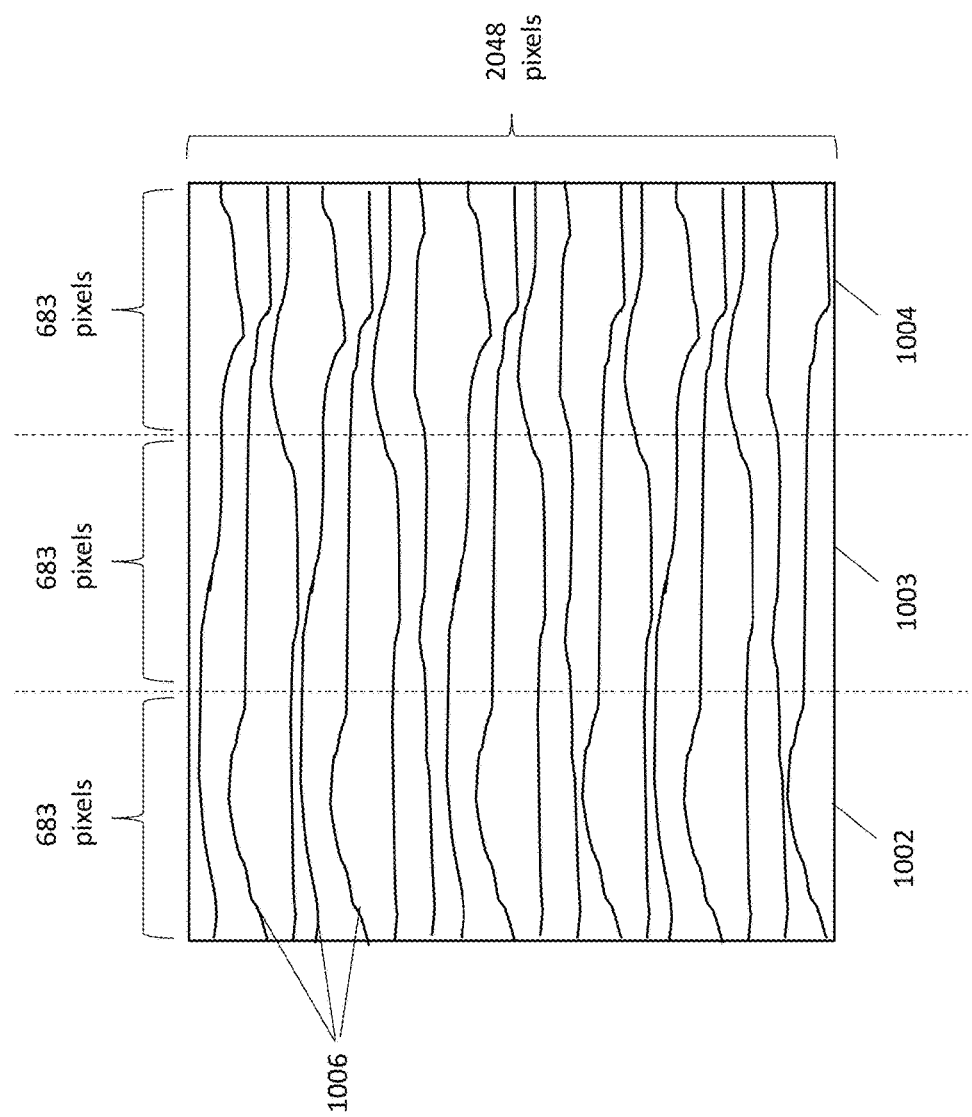

US 12,073,554 B2

CHARCOAL IDENTIFICATION SYSTEM

BACKGROUND

In 2018, global trade in forest products represented a value chain of more than 550 billion USD, and was at the highest volume since record-keeping began in 1947. This value chain includes logs, timbers, dressed lumber, veneers, finished products, comminuted wood products, pulp and pulp-derived products, wood fuel, and charcoal, among others. Illegal logging accounts for 15-30% of the global timber supply chain, resulting in lost revenue for source countries, governmental corruption, and unregulated degradation of forest lands. Of the illegal trade in timber, it is estimated that 80% is controlled by transnational criminal enterprises. This makes illegal logging the fourth most lucrative form of transnational crime after counterfeiting, drug trafficking, and human trafficking, and the most profitable form of transnational natural resource crime.

SUMMARY

An illustrative method for identifying charcoal products includes capturing, by a camera, an image of a sample of charcoal. The method also includes analyzing, by a processor in communication with the camera, the image of the sample to identify characteristics of the sample. The method also includes comparing, by the processor, the identified characteristics to a plurality of signatures to determine a match between the identified characteristics and known characteristics associated with each signature in the plurality of signatures. The method further includes generating, by the processor, an output based on the comparison.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A depicts macroscopic images of black locust wood obtained using the proposed system in accordance with an illustrative embodiment.

FIG. 1B depicts a macroscopic image of oak charcoal obtained using the proposed system in accordance with an illustrative embodiment.

FIG. 6A is a table depicting an example wood data set in accordance with an illustrative embodiment.

FIG. 6B is a table depicting an example charcoal data set in accordance with an illustrative embodiment.

FIG. 7 depicts the hyperparameters used for training the wood and charcoal models in accordance with an illustrative embodiment.

FIG. 8 depicts additional confusion matrices for the wood identification models in accordance with an illustrative embodiment.

FIG. 10B depicts a divided image in accordance with an illustrative embodiment.

DETAILED DESCRIPTION

Figure 2:
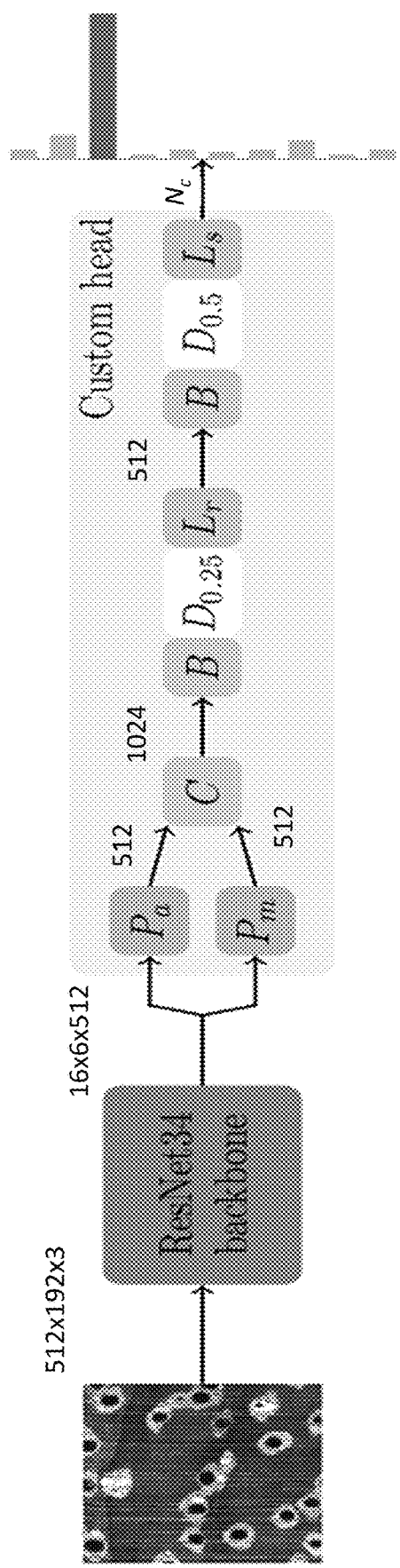
FIG. 2 is a schematic of the machine learning architecture implemented for wood and charcoal models in accordance with an illustrative embodiment.

Forests, which are estimated to contain two thirds of the biodiversity on earth, face existential threats due to illegal logging and land conversion. As a result of the global scale of illegal logging and its ties to transnational organized crime, industrial compliance with and governmental enforcement of laws and regulations governing trade in wood and wood-derived products have remained an international priority. This is evidenced by the Convention on the International Trade in Endangered Species, the Lacey Act, the European Union Timber Regulation, Australia's Illegal Logging Protection Act (2012), the Illegal Logging Protection Regulation (2014), etc. There is also growing interest in 'greening' the charcoal value chain, which directly impacts the energy needs and livelihoods of one-third of the world's population. Research and technology development in support of law enforcement and industrial compliance have emphasized predominantly laboratory-based approaches. However, the first (and in some jurisdictions the only) step in the enforcement of provisions against illegal logging is identification or screening of products in the field, at ports, during border crossings, and at other points of control.

Unfortunately, traditional efforts to combat illegal logging and to support sustainable value chains are hampered by a critical lack of affordable and scalable technologies for field-level inspection of wood and wood products. The current state-of-the-art for routine field screening of wood across the world is an entirely human enterprise using naked eye and hand lens observation of wood anatomical features. Field screening of wood is severely limited by the dearth of human expertise in forensic wood analysis, and there is even less field expertise for various wood products such as charcoal. Affordable and scalable technologies that can either dramatically extend or obviate the need for human expertise clearly have value in solving the global field-screening limitation. Additionally, effective evidence-based policy development for compliance or enforcement will require context-dependent modifications to the adopted technology.

Described herein is a complete, self-contained, multi-illumination, field-deployable system for field imaging and identification of forest products at the macroscopic scale. The proposed system integrates an imaging system built with off-the-shelf components, flexible illumination options with visible and UV light sources, software for camera control, and deep learning models for identification. As discussed in more detail below, the capabilities of the proposed system are demonstrated with example applications for automatic wood and charcoal identification using visible light and human-mediated wood identification based on ultra-violet illumination. The proposed system has applications in field imaging, metrology, and material characterization of substrates.

The proposed system is the first complete, open-source, do-it-yourself platform for imaging, identification, and metrology of materials exhibiting useful macroscopic variability, such as wood and charcoal. FIG. 1A depicts macroscopic images of black locust wood obtained using the proposed system in accordance with an illustrative embodiment. As shown, the leftmost macroscopic image in FIG. 1A was captured using visible light and the macroscopic image on the right was captured using ultraviolet (UV) light. FIG. 1B depicts a macroscopic image of oak charcoal obtained using the proposed system, using visible light, in accordance with an illustrative embodiment.

In an illustrative embodiment, the proposed system provides controlled visible light and UV illumination capability, continuously-adjustable illumination positioning, and software to control the device, capture images, and deploy trained classification models for field screening. Compared to laboratory-based methods, the proposed system exists at an affordable and scalable price point such that it can be deployed in the developing world, in research institutions with modest budgets, and even in classrooms.

The proposed system includes an imaging system to capture images and a computing system to process the images and run algorithms to make identifications based on the captured images. In one embodiment, the proposed system has two distinct positions for its illumination array (a wood position and a charcoal position) and a range of intermediate positions. When in the wood position, the illumination array is as close to the specimen as possible (e.g., ~3 mm), and when in the charcoal position, it is as distant from the specimen as possible (e.g., ~49 mm). In this way, the system maximizes the visibility of anatomical features for each material. In an illustrative embodiment, the system images a fixed tissue area of 6.35×6.35 millimeters (mm) over a 2,048×2,048 pixel image. Alternatively, a different fixed tissue area and/or number of pixels may be used. As discussed in more detail below, the 2,048×2,048 pixel image may be subdivided into a plurality of image patches, and the system may individually assess one or more of the image patches during training and/or use. For example, during training, multiple images per class are used. In the field, various processing options include assessment of multiple image patches (or segments) from an image, assessment of multiple images from a specimen, assessment of both multiple image patches from an image and multiple images from a specimen, etc.

A number of wood and charcoal samples were prepared and analyzed to train the system for future recognition. Specifically, to test the proposed system, 470 wood specimens from 31 species were selected for imaging based on the wood anatomy, surface fluorescence, and geographic origin. The transverse surfaces of the selected specimens were dry sanded to 1,500 grit then imaged using visible light with an illumination array of the system in the wood position, resulting in a dataset comprised of 3,126 non-overlapping images. Radial and/or tangential surfaces of the sample may also be used alone or in combination with the transverse surface. In many contexts wood identification at the species level is not possible and/or not required. This was leveraged to group the selected species into 12 classes for identification at a practical taxonomic granularity and to address the data scarcity problem prevalent in machine learning based wood identification.

Commercial lump charcoal specimens were used as reference material to collect the charcoal image data set. The charcoal specimens from six genera were identified/verified by using traditional methods. The selected six genera represented 74% of the European FSC-certified lump charcoal submitted. With the system's illumination array in the charcoal position, 1,312 non-overlapping images of the transverse surfaces polished to 1,000 grit of 150 charcoal specimens were obtained using visible light illumination. Radial and/or tangential surfaces of the sample may also be used alone or in combination with the transverse surface. The image dimensions and optical resolution were the same as those for the wood image data set.

Separate models for wood and charcoal identification were trained using a two-stage transfer learning strategy and an ImageNet pre-trained backbone with custom classifier heads. In a first stage, the backbone was used as a feature extractor (i.e., weights frozen) and the weights of the custom head were learned, while the weights of the entire network were fine-tuned during a second stage. Both stages employed an Adam optimizer with simultaneous cosine annealing of the learning rate and momentum. Random image patches of size (in pixels) 2,048×768 were down sampled to 512×192 and input to the models in minibatches of size 16 with a data augmentation strategy that included horizontal/vertical flips, small rotations, and cutout. The model performance for specimen classification was evaluated using five-fold cross validation with the predicted class for a test set specimen being the majority of the class predictions for the images of the specimen. It is noted that any given specimen contributed images only to a single fold.

FIG. 2 is a schematic of the machine learning architecture implemented for wood and charcoal models in accordance with an illustrative embodiment. As shown, images of wood/charcoal are fed into a convolutional neural network (CNN). The CNN includes a ResNet34 backbone and a custom head. The CNN is a particular type of machine learning model, and in alternative embodiments a different model may be used. In alternative embodiments, a different type of backbone, CNN, or machine learning approach may be used. Processing is performed in the custom head shown in FIG. 2, in which $P_a$ refers to global average pooling, $P_m$ is global max pooling, C is concatenation, B is Batchnorm, $D_p$ is dropout (parameter p), $L_r$ is rectified linear activation (ReLU), and $L_s$ is linear Softmax activation. Alternatively, a different custom head may be used, and other parameters can be varied according to the machine learning architecture used.

Figure 3B:
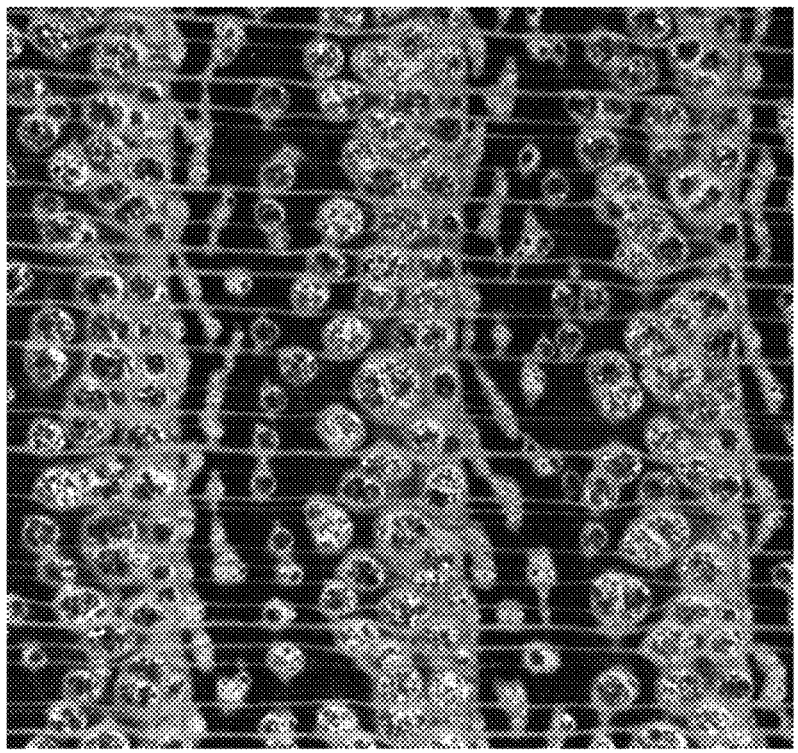
FIG. 3B depicts an image of *Robinia pseudoacacia* captured with visible light illumination in accordance with an illustrative embodiment.
Figure 3A:
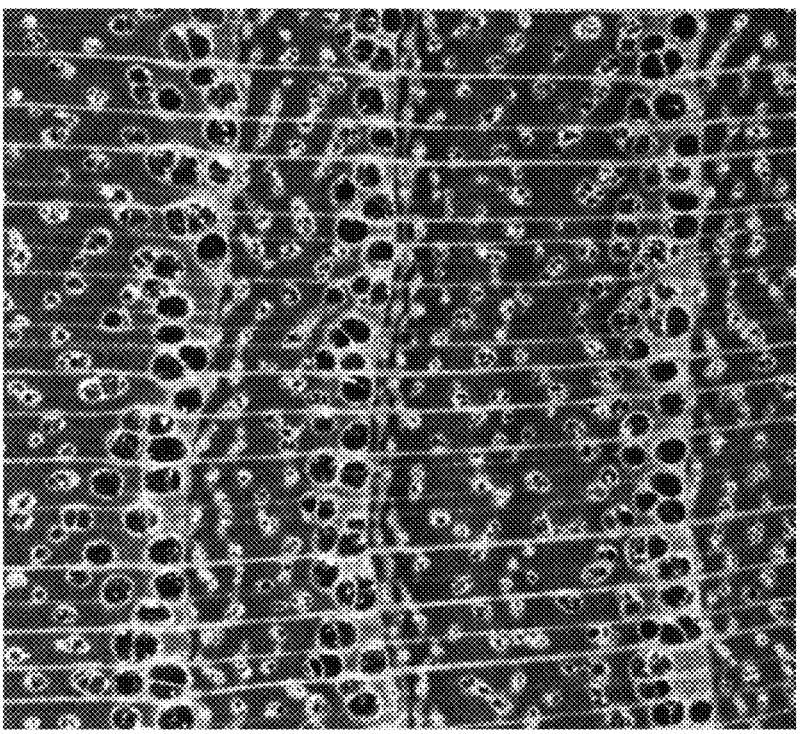
FIG. 3A depicts an image of *Morus rubra* captured with visible light illumination in accordance with an illustrative embodiment.
Figure 3F:
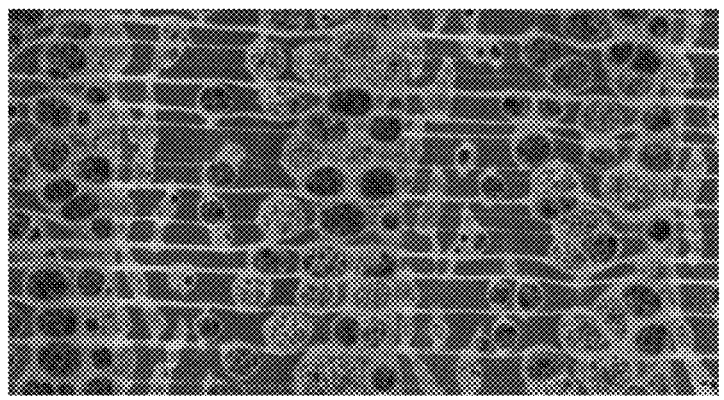
FIG. 3F depicts a second image of *Robinia pseudoacacia* captured with ultraviolet light illumination in accordance with an illustrative embodiment.
Figure 3E:
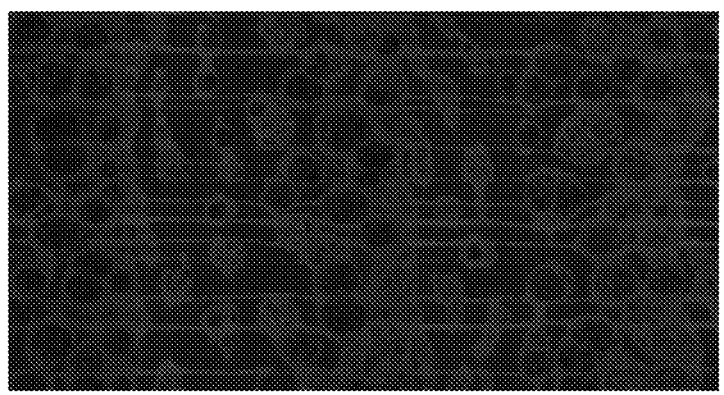
FIG. 3E depicts a first image of *Robinia pseudoacacia* captured with ultraviolet light illumination in accordance with an illustrative embodiment.
Figure 3D:
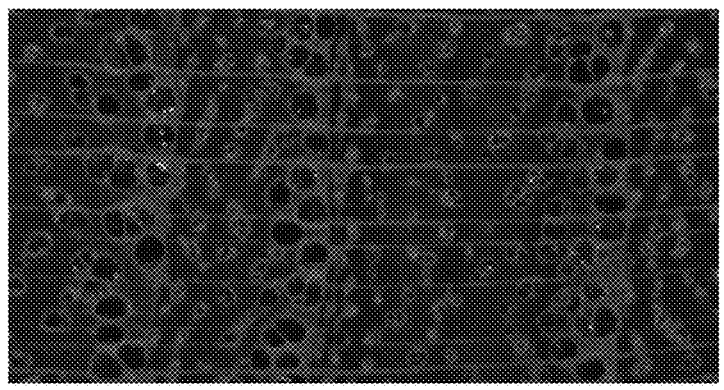
FIG. 3D depicts a second image of *Morus rubra* captured with ultraviolet light illumination in accordance with an illustrative embodiment.
Figure 3C:
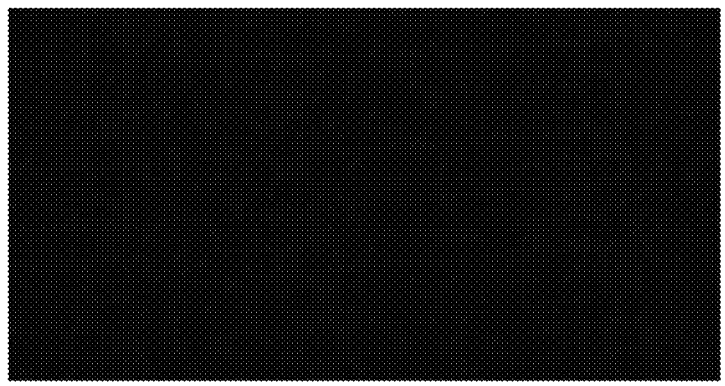
FIG. 3C depicts a first image of *Morus rubra* captured with ultraviolet (UV) light illumination in accordance with an illustrative embodiment.

The trained system was shown to work well for both wood and charcoal identification. *Morus rubra* and *Robinia pseudoacacia* are two species of wood that are readily confusable at the macroscopic scale using only visible light and traditional wood anatomy. However, these 2 species have markedly different surface fluorescence properties. The images in FIGS. 3A, 3C, and 3D are all of the same *Morus rubra* sample, and the images in FIGS. 3B, 3E, and 3F are all of the same *Robinia pseudoacacia* sample. Specifically, FIG. 3A depicts an image of *Morus rubra* captured with visible light illumination in accordance with an illustrative embodiment. FIG. 3B depicts an image of *Robinia pseudoacacia* captured with visible light illumination in accordance with an illustrative embodiment. FIG. 3C depicts a first image of *Morus rubra* captured with ultraviolet (UV) light illumination in accordance with an illustrative embodiment. FIG. 3D depicts a second image of *Morus rubra* captured with ultraviolet light illumination in accordance with an illustrative embodiment. FIG. 3E depicts a first image of *Robinia pseudoacacia* captured with ultraviolet light illumination in accordance with an illustrative embodiment. FIG. 3F depicts a second image of *Robinia pseudoacacia* captured with ultraviolet light illumination in accordance with an illustrative embodiment. The various images were obtained using different camera gain and exposure times, as follows: FIG. 3C (0 decibel (dB) gain and 133 millisecond (ms) exposure), FIG. 3D (24 dB gain and 133 ms exposure), FIG. 3E (0 dB gain and 13 ms exposure), and FIG. 3F (24 dB gain and 29 ms exposure). In alternative embodiments, different gains and/or exposure times may be used.

As shown in FIG. 3, the visible light images of the two woods clearly depict the underlying anatomical structure. *Morus rubra* does not exhibit surface fluorescence, so when imaged with UV illumination, the images show no (FIG. 3C) or comparatively little (FIG. 3D) anatomical detail. *Robinia pseudoacacia*, by contrast, exhibits bright yellow-green surface fluorescence thus the images taken with UV illumination clearly show the anatomy (FIGS. 3E and 3F). This demonstrates the capability of the system to image wood using visible light and to record surface fluorescence in wood substrates for identification and screening.

Figure 4C:
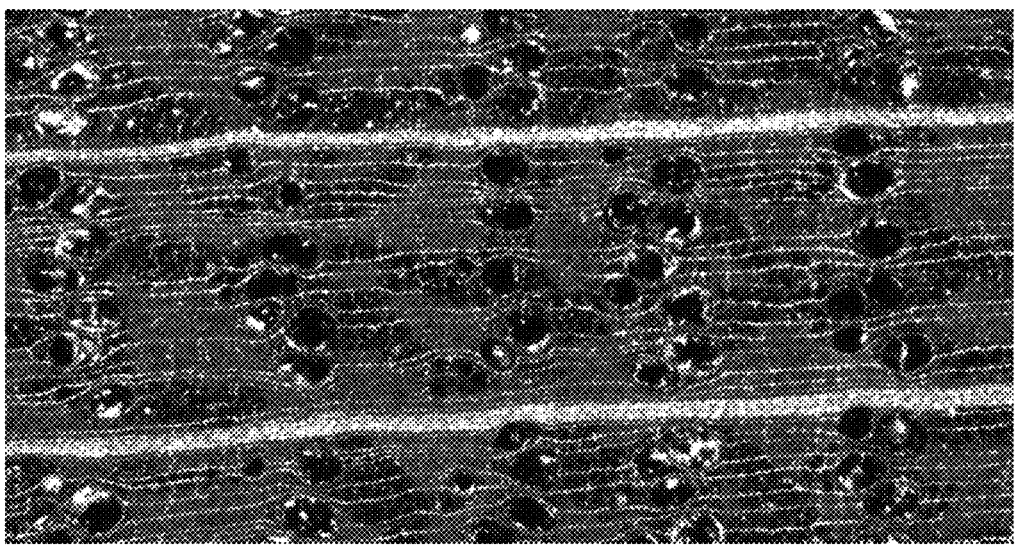
FIG. 4C depicts a system image of charcoal imaged with the illumination array in the charcoal position in accordance with an illustrative embodiment.
Figure 4B:
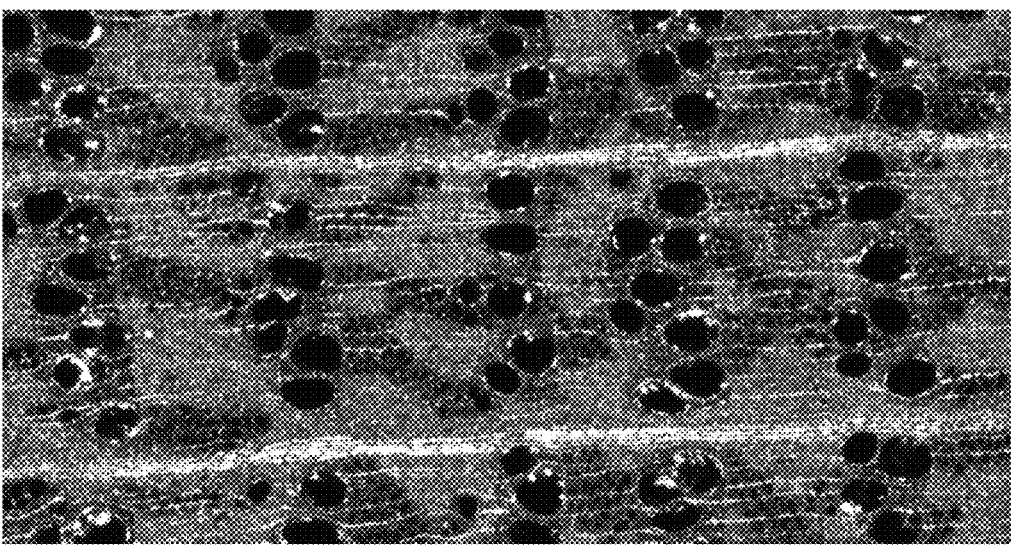
FIG. 4B depicts a system image of charcoal imaged with the illumination array in the wood position in accordance with an illustrative embodiment.
Figure 4A:
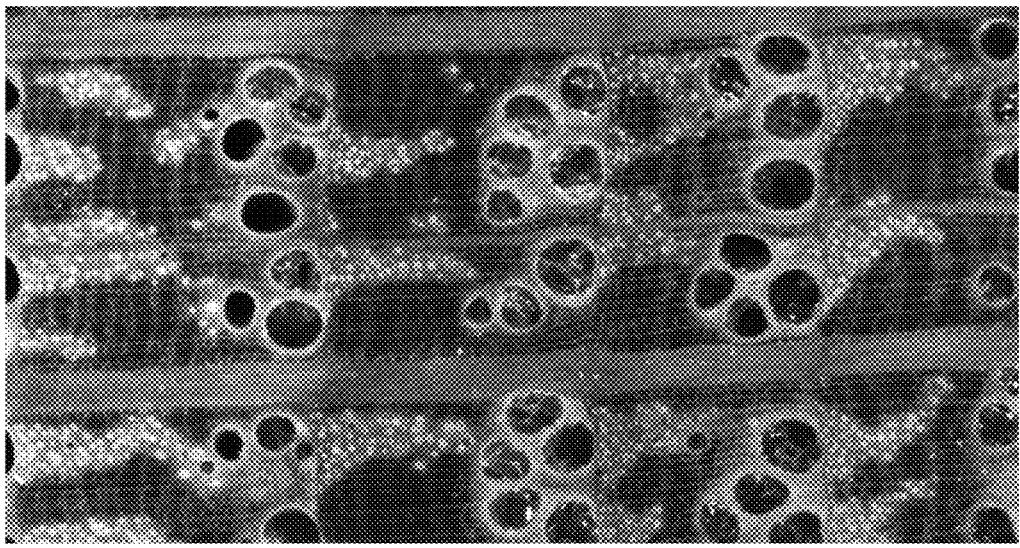
FIG. 4A depicts a system image of wood imaged with the illumination array in the wood position in accordance with an illustrative embodiment.

The trained system was also used to identify charcoal specimens. As discussed, the adjustable illumination array position of the system enables high-quality imaging of both wood and charcoal substrates. The position of the illumination array for the charcoal position was determined to provide the best visualization of wood anatomical details necessary for robust charcoal identification. It was determined through experimentation that the fine wood anatomical detail of the charcoal is better revealed when the illumination array is more distant from the specimen. FIG. 4A depicts system images of wood imaged with the illumination array in the wood position in accordance with an illustrative embodiment. FIG. 4B depicts system images of charcoal imaged with the illumination array in the wood position in accordance with an illustrative embodiment. FIG. 4C depicts system images of charcoal imaged with the illumination array in the charcoal position in accordance with an illustrative embodiment. As shown, fine anatomical details such as banded apotracheal parenchyma in the latewood are visible in FIGS. 4A and 4C, but not in FIG. 4B. These images thus demonstrate the effectiveness of using the different positions of the illumination array for wood and charcoal.

Figure 5A:
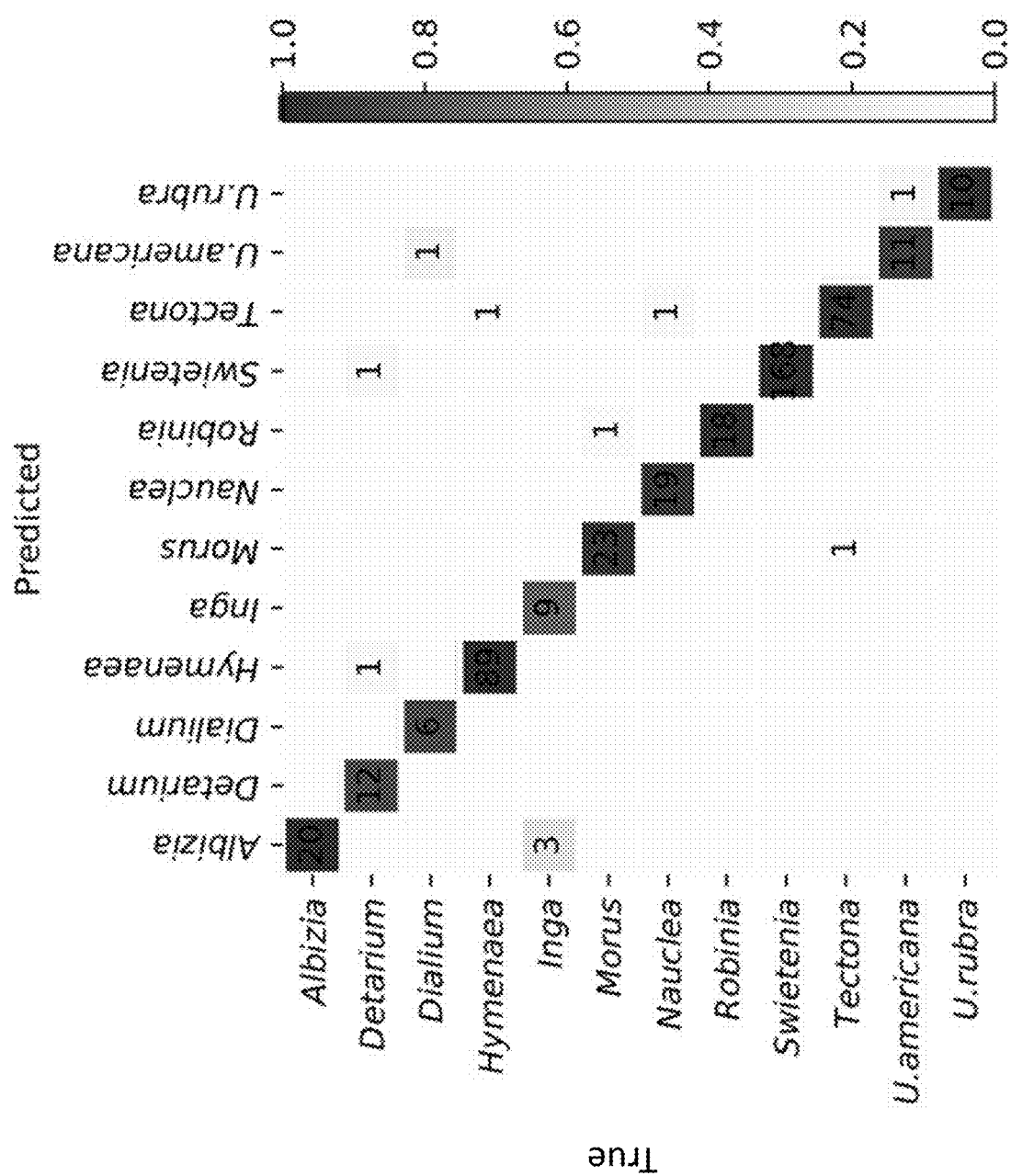
FIG. 5A shows a specimen prediction confusion matrix using the identification system for wood in accordance with an illustrative embodiment.

FIG. 5A shows a specimen prediction confusion matrix using the identification system for wood under visible light with the lighting array in the wood position in accordance with an illustrative embodiment. The confusion matrix for wood is based on a trained version of the system in which 12 wood classes are used. In alternative implementations, additional, fewer, or different wood classes may be used to train the system. The specimen classification accuracy for wood was 97.7%. Most of the incorrect predictions for wood can be overcome by the use of UV illumination to determine the presence (or absence) of fluorescence. A user or the computing system can use the presence/absence of fluorescence to distinguish between similar wood classes under visible light. For example, Albizzia and Inga are two wood classes that appear similar in visible light, however, Albizzia is fluorescent and Inga is not. UV imaging and the resulting fluorescence can similarly be used to distinguish between *Robinia* and *Morus*, between *Hymenaea* and *Detarium*, between classes Ulmus rubra and Ulmus americana, etc.

Figure 5B:
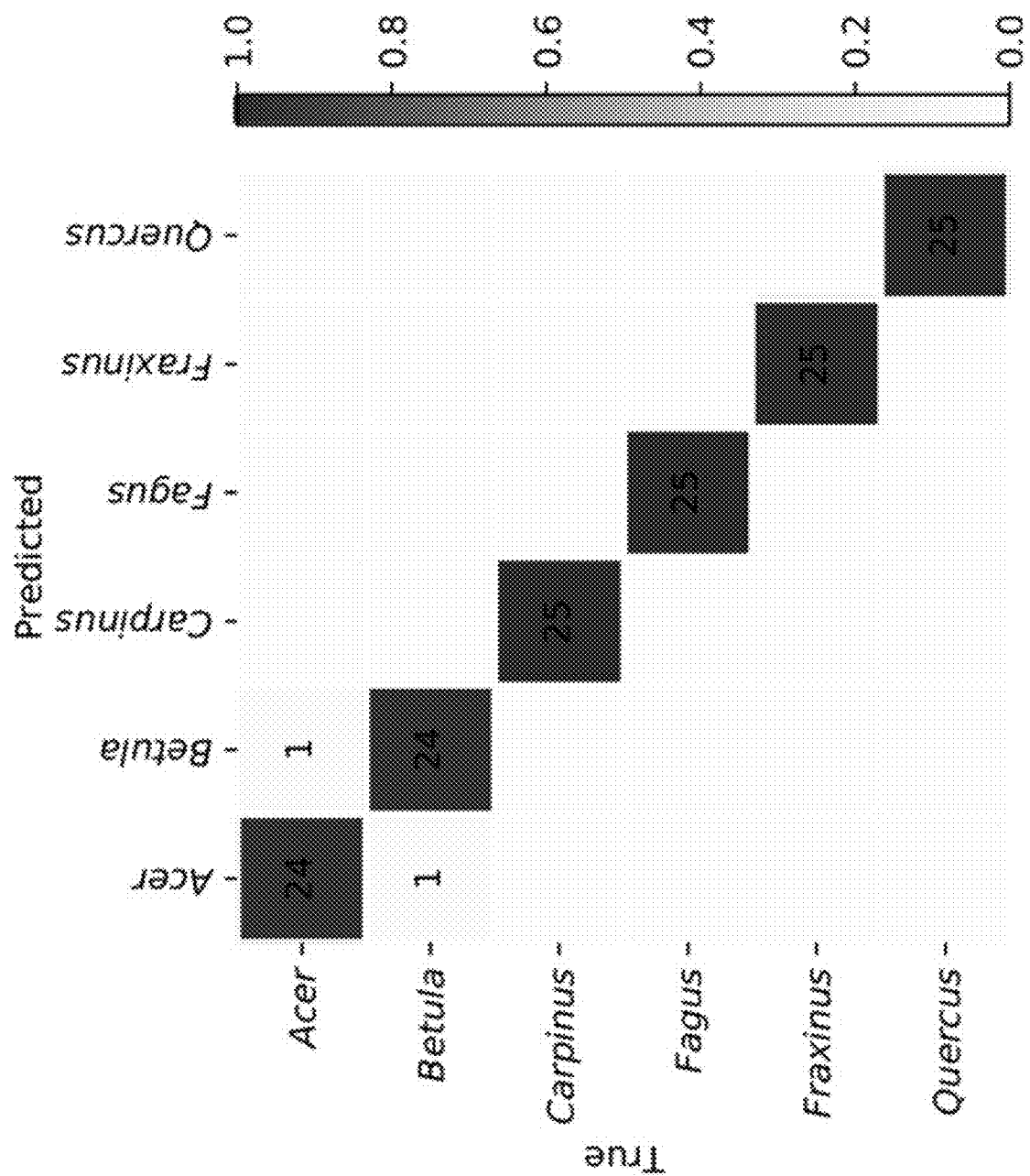
FIG. 5B shows a specimen prediction confusion matrix using the identification system for charcoal in accordance with an illustrative embodiment.

FIG. 5B shows a specimen prediction confusion matrix using the identification system for charcoal in accordance with an illustrative embodiment. This confusion matrix is with respect to a proof-of-concept 6-class charcoal identification model using visible light illumination and the illumination array in the charcoal position. In alternative implementations, additional, fewer, or different charcoal classes may be used to train the system. The overall accuracy of the model is 98.7%, with misclassifications limited to confusion between classes Acer and Betula, which are known to be macroscopically similar on their transverse surface.

As discussed, the proposed system utilized machine learning to develop image classification (identification) models based on macroscopic image data sets for both wood and charcoal. Specifically, a convolution neural network (CNN) architecture was used for the wood and charcoal identification models. One difference between the two models is the length of the final prediction vector. In some embodiments, for wood identification, the prediction of the CNN is a vector of length 12, while it is a vector of length 6 for charcoal identification. In alternative embodiments, different vector lengths may be used as the vector lengths are a function of the number of classes used in the models.

FIGS. 6-9 provide additional details regarding the data sets and training of the neural network. As discussed in more detail below, the neural network or other machine learning model captures the wood anatomical characteristics of the specimen surface image with a numerical signature. FIG. 6A is a table depicting an example wood data set in accordance with an illustrative embodiment. As shown, 3126 images were collected from 470 wood specimens. The 31 species were divided into 12 classes, and classes that exhibit surface fluorescence are highlighted. FIG. 6B is a table depicting an example charcoal data set in accordance with an illustrative embodiment. As shown, there were 6 classes of charcoal in the dataset, with 1312 images collected from 150 charcoal specimens. In alternative embodiments, different numbers and/or types of wood/charcoal can be incorporated into the datasets to improve overall system identification and/or identify different species or genera of wood or charcoal. For example, or images per class can improve overall system identification (i.e., more data per class, for the same set of classes, can be better). The model can also be designed to handle additional classes.

The models for wood and charcoal identification were trained using a two stage transfer learning methodology. In the first stage, the weights of the pre-trained backbone were frozen and the (randomly initialized) weights of the custom head were learned. The weights in the entire network were fine tuned in the second stage. Random image patches of size 2048×768 pixels were resized to 512×192 pixels and input to the CNN in mini-batches of size 16. An Adam optimizer was used for both the stages with simultaneous annealing of the learning rate and momentum in two phases. In the first phase the learning rate was increased from $\alpha_{min}$ to $\alpha_{max}$ while the momentum was decreased from $\beta_{max}$ and $\beta_{min}$ while in the second phase the learning rate was decreased and the momentum was increased between the same limits as in phase one. Cosine annealing was used for both phases. The value $\alpha_{max}$ was estimated using a learning rate estimation methodology. In alternative implementations the system may be trained using random initializations, using self-supervised training, using multi-task training or with unsupervised training followed by supervised fine-tuning. FIG. 7 depicts the hyperparameters used for training the wood and charcoal models in accordance with an illustrative embodiment.

The wood and charcoal data sets were split into 5 folds with class level stratification. The splits were performed in such a way that each specimen contributed images to exactly one of the folds. This constraint allowed the models to be trained and tested on mutually exclusive specimens. In the case of wood identification, this ensures model training and testing was done with specimens from different trees. The charcoal specimens were obtained from specimens submitted for forensic verification of commercially available charcoal in Europe. In this case, it was known that the specimens were from geographically distributed locations and multiple vendors, but tracing each charcoal specimen to the source tree was not possible in this example data set. In another embodiment, the dataset used for training can involve using images of wood that are modified to match/mimic the digital image statistics and appearance of charcoal digital images.

Class predictions for the test fold images were obtained using the trained models. The class prediction for a specimen in the test fold was obtained as the majority label of the predictions on its images. Weights of the custom CNN head were randomly initialized (He normal initialization) from 5 different seeds and for each seed five fold cross validation was carried out using the splits and training procedure described herein. From confusion matrix $C_{s,f}$ for seed s and fold f, an accumulated confusion matrix $C_s$ for each seed s was obtained as:

$$C_s = \sum_{f=1}^{5} C_{s,f}, s \in \{1, 2, 3, 4, 5\}.$$

Figure 9:
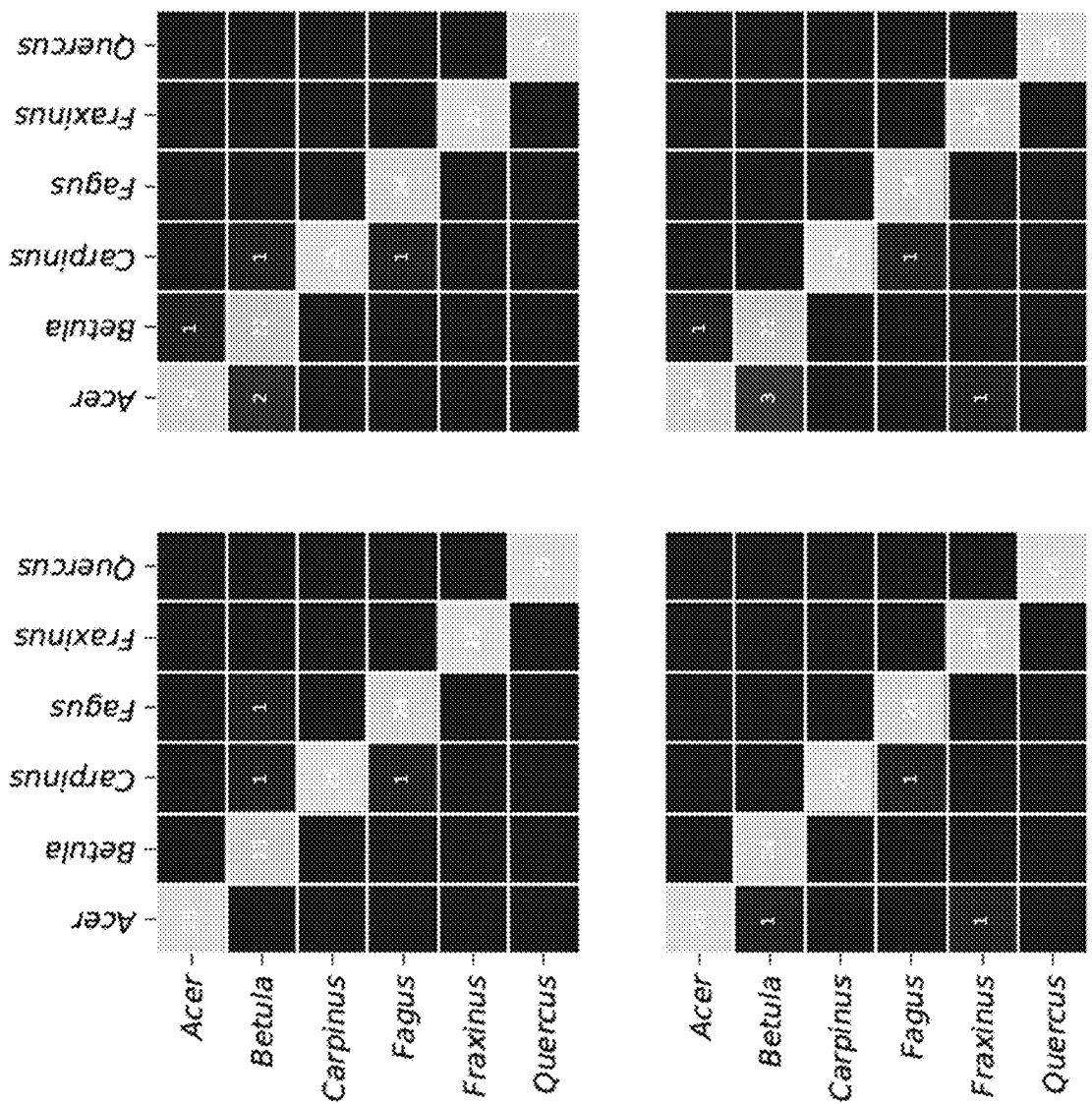
FIG. 9 depicts additional confusion matrices for the charcoal identification models in accordance with an illustrative embodiment.

FIG. 8 depicts additional confusion matrices for the wood identification models in accordance with an illustrative embodiment. FIG. 9 depicts additional confusion matrices for the charcoal identification models in accordance with an illustrative embodiment. In FIGS. 8 and 9, cell shading is coded by accuracy percentages, and annotations are included for cells with non-zero specimen counts. These confusion matrices are meant as examples. In alternative embodiments, different confusion matrices would be generated for wood and/or charcoal identification models.

Figure 10A:
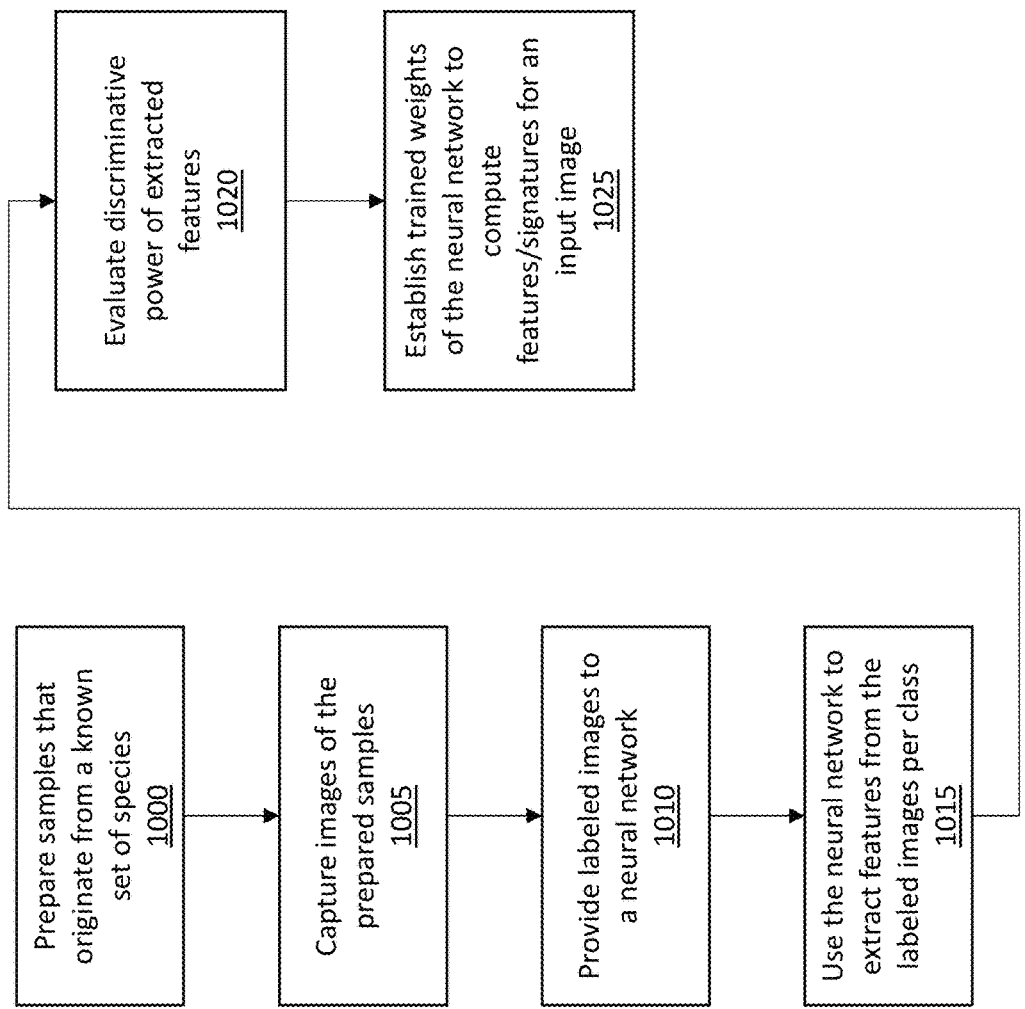
FIG. 10A is a flow diagram depicting operations performed to train a computing system (e.g., neural network) to identify wood/charcoal in accordance with an illustrative embodiment.

FIG. 10A is a flow diagram depicting operations performed to train a computing system (e.g., neural network) to identify wood/charcoal in accordance with an illustrative embodiment. In alternative embodiments, fewer, additional, and/or different operations may be performed. Additionally, the use of a flow diagram is not meant to be limiting with respect to the order or number of operations performed. In an operation 1000, one or more samples of wood or charcoal from a known set of wood species is prepared. Preparation of the sample can include cutting the wood/charcoal to expose a transverse surface of the sample(s) and dry sanding the sample(s) to 1,500 grit. In alternative embodiment, a different grit level may be used, such as 1000 grit, 1200 grit, 1800 grit, etc. Preparing the sample(s) can also include cleaning the sample(s) with forced air and/or a cloth to remove any sawdust and debris from the transverse surface of the wood. In some embodiments, a radial plane and/or a tangential plane of the wood can be imaged alone or in addition to the imaging of the transverse surface. In another alternative embodiment, fewer or additional operations may be performed to prepare the sample(s).

In an operation 1005, images of the prepared samples are captured using a camera. In an illustrative embodiment, the camera can be a smartphone camera that is used in conjunction with a magnification and illumination element (e.g., a lens plus lighting array) to increase the magnification of the obtained images. As discussed, the camera and magnification element can be at a first position (relative to the sample) to image charcoal samples and at a second position (relative to the sample) to image wood samples. The camera can also be used in conjunction with illumination such as visible light and/or ultraviolet light, depending on the type of sample begin imaged. For example, when imaging wood, the illumination array of the camera is as close to the specimen as possible, and when imaging charcoal, the illumination array is positioned as distant from the specimen as possible, or otherwise configured to maximize the clarity of the anatomical features of the charcoal. Also, the illumination array can include at least visible light and UV light transmitted by one or more light sources such as light-emitting diodes, incandescent bulbs, UV lamps, fluorescent bulbs, etc. In some embodiments, the user can select between the visible and UV light source based on whether the sample exhibits surface fluorescence in response to the UV light. If the user does not know whether the sample exhibits surface fluorescence, both visible light and UV light imaging may be performed to determine which type of imaging results in the best images to use (i.e., the images that depict the most defining characteristics of the sample).

In an illustrative embodiment, the captured images are from samples whose identification (e.g., species) is known. As such, the images can be labeled with the appropriate (known) species before being provided to the neural network. In an operation 1010, the labeled images are provided to the neural network. While a neural network is described, it is to be understood that any type of network or computing system known in the art may be trained to implement the operations described herein.

In one embodiment, prior to providing the images to the neural network, the system may divide the image into a plurality of image patches, and one or more of the image patches may be provided to the neural network. For an example embodiment, the captured image may be 2048× 2048 pixels. Such an image can be subdivided by the system into 3 image patches, each having ~683×2048 pixels (or alternatively 768×2048 pixels). In an illustrative embodiment, the image can be divided along an orientation that maximizes the number of tree growth rings present in the image patch. FIG. 10B depicts a divided image in accordance with an illustrative embodiment. As shown, a 2048×2048 pixel image is divided into a first image patch 1002, a second image patch 1003, and a third image patch 1004, each of which is approximately 683×2048 pixels in size. The image patches are delineated by vertical dashed lines in the figure. In alternative embodiments, a different starting image size or image patch size may be used (e.g., 4 image patches of 512×2048 pixels, etc.). As also shown, the image is divided (vertically in this example) such that each patch includes a maximum number of tree growth rings 1006. In an embodiment in which the orientation of the image is rotated by 90 degrees (relative to the image in FIG. 10B), the image division may be performed horizontally to maximize the number of tree growth rings in each image patch. The user or the system can determine the orientation at which to divide the image based on image analysis that identifies the growth rings in the sample.

Referring again to FIG. 10A, in an operation 1015, the neural network extracts features from the labeled images per class. This can be done through the application of rules to the labeled images, where the rules are in the form of mathematical computations. Specifically, standard optimization methods are used to learn the parameters of the neural network, which are used to develop a signature for a given image. The rules can be mathematical computations defined by the CNN architecture (Pa, dropout, etc.). Inside these functions are parameters that are set (i.e., learned) algorithmically using the training data to get the best identification performance for the woods included in the model. Any of the rules or categorizations described herein may be used, including hand-engineered features such as GLCM, Gabor filters, SIFT, etc, and/or automatically learned features. In an operation 1020, the system evaluates the discriminative power of the extracted features. In an operation 1025, the system established learned weights are stored and used to compute a signature for any input image. The signature encodes the discriminative anatomical features of the image or image patches. The signature can be specific to a species of wood generally and/or to a species of wood that originates from a specific region. These signatures of the known species of wood result in a trained the neural network (or other system). The trained neural network allows for unknown wood/charcoal samples to be recognized (with respect to species and/or location of origin) based at least in part on the similarities of the unknown sample to the characteristics in each signature learned by the system. As known in the art, the training is an iterative process that can take numerous iterations to complete.

Figure 11:
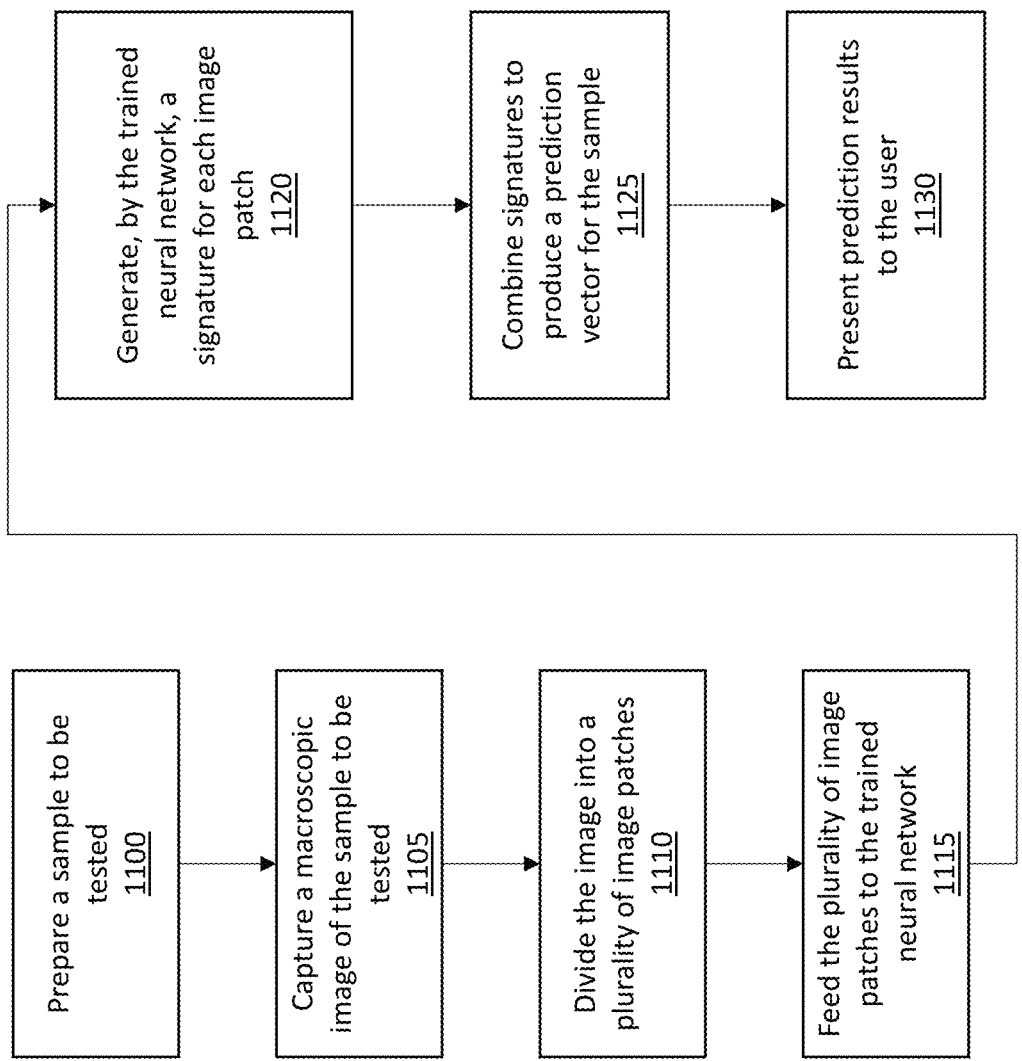
FIG. 11 is a flow diagram depicting operations performed to identify wood/charcoal using a trained computing system (e.g., neural network) in accordance with an illustrative embodiment.

FIG. 11 is a flow diagram depicting operations performed to identify wood/charcoal using a trained computing system (e.g., neural network) in accordance with an illustrative embodiment. In alternative embodiments, fewer, additional, and/or different operations may be performed. Additionally, the use of a flow diagram is not meant to be limiting with respect to the order of operations performed. In an operation 1100, a sample (wood or charcoal) is prepared to be tested. As discussed, preparation of the sample can include cutting the wood/charcoal to expose a transverse surface of the sample and dry sanding the sample(s) to 1,500 grit or a different grit level. Preparing the sample can also include cleaning the sample with forced air and/or a cloth to remove any sawdust and debris from the transverse surface of the wood. In an alternative embodiment, fewer or additional operations may be performed to prepare the sample(s).

In an operation 1105, a macroscopic image of the sample to be tested is captured using a camera. Any type of camera may be used, such as a cell phone camera, etc. In an illustrative embodiment, a user of the camera selects an appropriate location for the lighting array relative to the sample (i.e., distance from the sample) depending on whether the sample is wood or charcoal. As discussed, when imaging wood, the illumination array of the camera is as close to the specimen as possible, and when imaging charcoal, the illumination array is as distant from the specimen as possible. In an illustrative embodiment, the illumination array can include at least visible light and UV light. In some embodiments, the user can select between the visible and UV light source based on whether the sample exhibits surface fluorescence in response to the UV light. If the user does not know whether the sample exhibits surface fluorescence, both visible light and UV light imaging may be performed to determine which type of imaging results in the best images to use (i.e., the images that depict the most defining characteristics of the sample).

In an operation 1110, the captured image is divided into a plurality of image patches. The image division can be performed as discussed with reference to FIG. 10B. Alternatively, a different division procedure may be used. In another alternative embodiment, the captured image may not be divided, and can instead by analyzed in its entirety by the neural network or other machine learning algorithm or system. In an operation 1115, the plurality of image patches are provided to the trained neural network. In an alternative embodiment, only a single image patch may be provided to the neural network or other machine learning algorithm or system.

In an operation 1120, the neural network of the system generates a signature for each image patch. In an illustrative embodiment, the system generates the signatures using the same rules (i.e., mathematical computations) that were used to classify images during training of the neural network. Alternatively, a different set of computations may be used. As discussed, in another alternative embodiment, only one (or a subset) of the image patches is used by the system to classify the sample. In an operation 1125, signatures from the plurality of images, or a plurality of image patches or a plurality of images and image patches are combined to produce a prediction vector for the sample.

In an operation 1130, an output from the trained neural network is generated and the prediction results are presented to the user. The output can be the prediction confidence of the neural network for each of the classes in the model. The system can pick the class that has the maximum confidence, which is the top prediction of the model. Alternatively, the system may identify the two classes with top 2 confidence predictions, which is the top two most likely classes the neural network thinks the image belongs to. Alternatively, a different number of most likely classes can be returned, such as 3, 4, etc. In an illustrative embodiment in which a plurality of image patches (or images) are classified, the output can be based on a combination of the classification of each image or image patch. For example, first and third image patches of an image may be identified as likely being oak wood or charcoal, and a second image patch of the image may be identified by the neural network as likely being ash wood or charcoal. Because a majority of the image patches were identified as likely being oak, the output from the neural network can indicate that the sample is likely oak. This analysis can also occur across multiple different images from the same specimen.

In another embodiment, the output from the neural network can be presented to the user (e.g., on a display of a computing device) as a plurality of predictions, with each prediction in the plurality of predictions having an associated confidence level. The confidence level can be in terms of a percentage likelihood that the sample is a given type of wood. As an example, the output may indicate that the system believes with 92% confidence that an analyzed sample is oak, a 6% confidence that the analyzed sample is poplar, and a 2% confidence that the analyzed sample is birch. Alternatively, a different type of confidence level may be used, such as an ordered list in which the order alone indicates the likelihood that sample is a given wood type (i.e., the first entry on the list has the highest likelihood of being correct, the second entry on the list has the second highest likelihood of being correct, etc.). In another embodiment, the output can include only the wood class that the system has identified with the highest likelihood (or confidence) of being correct. Continuing the example above, in such an embodiment, the output from the system may indicate that the sample is likely oak because the system identified the sample as oak with the highest (92%) confidence.

Figure 12:
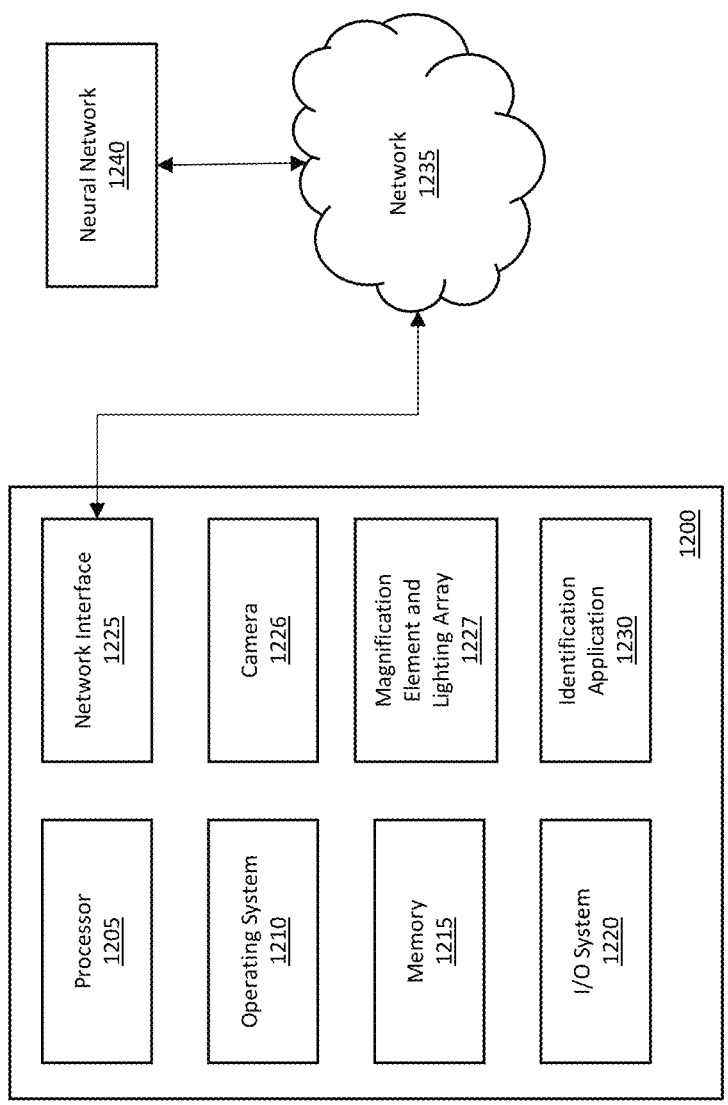
FIG. 12 is a block diagram depicting various components of a system for identifying wood/charcoal in accordance with an illustrative embodiment.

FIG. 12 is a block diagram depicting various components of a system for identifying wood/charcoal in accordance with an illustrative embodiment. FIG. 12 depicts a user computing device 1200 in communication with a network 1235 and a remote neural network 1240. The remote neural network 1240 can be implemented on any type of computing device, and can include a processor, memory, transceiver, user interface, etc. As discussed, the remote neural network 1240 is a trained network used by the system to classify an image of wood/charcoal that was captured by the user computing device 1200. In an alternative embodiment, the neural network 1240 may be local and incorporated into the user computing device 1200. The user computing device 1200 includes a processor 1205, an operating system 1210, a memory 1215, an input/output (I/O) system 1220, a network interface 1225, a camera 1226, a magnification element and lighting array 1227, and a wood/charcoal identification application 1230. In alternative embodiments, the user computing device 1200 may include fewer, additional, and/or different components.

The components of the user computing device 1200 communicate with one another via one or more buses or any other interconnect system. The user computing device 1200 can be any type of computing device, such as a smartphone, tablet, laptop computer, gaming device, music player, etc. In an alternative embodiment, instead of a smartphone or similar device, the user computing device 1200 can be a dedicated device specific to the identification application 1230.

The processor 1205 can be in electrical communication with and used to control any of the system components described herein. The processor 1205 can be any type of computer processor known in the art, and can include a plurality of processors and/or a plurality of processing cores. The processor 1205 can include a controller, a microcontroller, an audio processor, a graphics processing unit, a hardware accelerator, a digital signal processor, etc. Additionally, the processor 1205 may be implemented as a complex instruction set computer processor, a reduced instruction set computer processor, an x86 instruction set computer processor, etc. The processor 1205 is used to run the operating system 1210, which can be any type of operating system.

The operating system 1210 is stored in the memory 1215, which is also used to store programs, user data, network and communications data, peripheral component data, the identification application 1230, and other operating instructions. The memory 1215 can be one or more memory systems that include various types of computer memory such as flash memory, random access memory (RAM), a universal serial bus (USB) drive, an optical disk drive, a tape drive, an internal storage device, a non-volatile storage device, a hard disk drive (HDD), a volatile storage device, etc. In some embodiments, at least a portion of the memory 1215 can be in the cloud to provide cloud storage for the system. Similarly, in some embodiments, any of the computing components described herein (e.g., the processor 1205, etc.) can be implemented in the cloud such that the system can be run and controlled through cloud computing.

The I/O system 1220 is the framework which enables users and peripheral devices to interact with the user computing device 1200. The I/O system 1220 can include one or more displays (e.g., light-emitting diode display, liquid crystal display, touch screen display, etc.) that allow the user to view images and results, a speaker, a microphone, etc. that allow the user to interact with and control the user computing device 1200. The I/O system 1220 also includes circuitry and a bus structure to interface with peripheral computing devices such as power sources, USB devices, data acquisition cards, peripheral component interconnect express (PCIe) devices, serial advanced technology attachment (SATA) devices, high definition multimedia interface (HDMI) devices, proprietary connection devices, etc.

The network interface 1225 includes transceiver circuitry (e.g., a transmitter and a receiver) that allows the computing device to transmit and receive data to/from other devices such as the remote neural network 1240, other remote computing systems, servers, websites, etc. The data transmitted to the remote neural network 1240 can include image data and/or metadata (for use as auxiliary information for identification, for use in a blockchain ecosystem, for use in other data tracking systems, etc.), training data and instructions, updates, etc. The data received from the remote neural network 1240 can include indication of one or more outputs (or results) that identify a type of wood/charcoal corresponding to an analyzed image, confidence percentage(s), etc. The network interface 1225 enables communication through the network 1235, which can be one or more communication networks. The network 1235 can include a cable network, a fiber network, a cellular network, a wi-fi network, a landline telephone network, a microwave network, a satellite network, etc. The network interface 1225 also includes circuitry to allow device-to-device communication such as Bluetooth® communication. As discussed, in an alternative embodiment, the system including the neural network 1240 may be entirely incorporated into the user computing device 1200 such that the user computing device 1200 does not communicate with the neural network 1240 through the network 1235.

The camera 1226 is used in conjunction with the display of the user computing device 1200 and the magnification element and lighting array 1227 to provide the user with a view of a sample and to capture one or more images of the sample. The lighting array can include at least a visible light transmitter in an illustrative embodiment. Any type of camera capturing visible light signals may be used. The magnification element can be a lens, magnifying glass, or other component that is used to magnify the sample such that a macroscopic image can be obtained. In an alternative embodiment, the magnification element and lighting array 1227 may be incorporated as an integral component of the camera 1226.

The wood/charcoal identification application 1230 can include software and algorithms in the form of computer-readable instructions which, upon execution by the processor 1205, performs any of the various operations described herein such as training the neural network 1240, determining which illumination source of the camera 1226 to use for capturing an image, determining an appropriate position for the camera and its illumination system (e.g., light-emitting diodes, UV lamp, etc.) relative to the sample, dividing a captured image into a plurality of image patches, communicating with the neural network 1240, displaying results/outputs from the neural network 1240, etc. In one embodiment, the neural network 1240 can be incorporated into the identification application 1230 such that the identification application 1230 also performs any of the operations of the neural network 1240 described herein. The identification application 1230 can utilize the processor 1205 and/or the memory 1215 as discussed above. In an alternative implementation, the identification application 1230 can be remote or independent from the user computing device 1200, but in communication therewith.

The above-discussed prototype and testing indicate that the wood/charcoal identification model performance vastly exceeds the performance of trained field personnel, and indeed approaches or exceeds expected field performance of forensic wood anatomy experts. Based on the analysis, the effective accuracy of a human-hybrid version of the system incorporating UV illumination for wood (as compared to a system that uses visible light only) increases from 97.7% to 99.1%. Field accuracy at this level distinctly exceeds even the best-performing experts in the United States when performance was evaluated at the genus level.

The proposed system is the first of its kind to inspect or identify charcoal, despite the fact that globally the charcoal sector generates income for more than 40 million people and caters to the energy needs of more than one-third of the world's population. In the absence of an existing field identification program for charcoal, one cannot directly compare the proposed system accuracy to field inspectors. However, by providing a highly accurate (98.7%), field-deployable, system for six classes of lump charcoal that only confuses anatomically similar charcoals, the system delivers the ability to inspect and verify materials that previously could only be assessed reliably in the laboratory or by a limited group of expert wood anatomists. Ongoing work is addressing the breadth of charcoal taxa currently identifiable with the proposed system, which is expected to more adequately sample the charcoals that represent the remaining 26% of the FSC-certified lump charcoal in the EU market.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for identifying charcoal products, the method comprising:

capturing, by a camera, an image of a sample of charcoal;

dividing, by a processor in communication with the camera, the image into a plurality of image patches, wherein the dividing comprises dividing the image at an orientation that results in a maximum number of growth rings in each image patch in the plurality of image patches;

analyzing, by the processor, one or more image patches in the plurality of image patches of the sample to identify characteristics of the sample;

comparing, by the processor, the identified characteristics to a plurality of signatures to determine a match between the identified characteristics and known characteristics associated with each signature in the plurality of signatures; and generating, by the processor, an output based on the comparison.

2. The method of claim 1, further comprising illuminating the sample of charcoal with one or more light sources.

3. The method of claim 1, wherein the processor analyzes a single image patch from the plurality of image patches to identify the characteristics of the sample.

4. The method of claim 1, wherein the output comprises a ranked list of wood species or classes of the sample, and wherein a first entry on the ranked list has a confidence level which is greater than or equal to confidence levels of other entries on the ranked list.

5. The method of claim 1, wherein the output comprises a ranked list of locations of origin of the sample, and wherein a first entry on the ranked list has a confidence level which is greater than confidence levels of other entries on the ranked list.

6. The method of claim 1, wherein the output comprises a ranked list of wood species or locations of origin, and wherein the output includes a confidence level of each entry on the ranked list.

7. The method of claim 1, wherein analyzing the image comprises applying a plurality of rules to the image of the sample.

8. The method of claim 7, wherein the plurality of rules are also used to identify characteristics of training images that are used to train the system through generation of the plurality of signatures.

* * * * *